United States Patent [19]

Willis

[11] Patent Number: 5,597,872
[45] Date of Patent: Jan. 28, 1997

[54] HYDROGENATION OF POLYMERS HAVING KETONE GROUPS

[75] Inventor: Carl L. Willis, Houston, Tex.

[73] Assignee: Shell Oil Company, Houston, Tex.

[21] Appl. No.: 529,304

[22] Filed: May 29, 1990

[51] Int. Cl.[6] .......................... C08F 297/04; C08F 8/04
[52] U.S. Cl. ...................... 525/314; 525/940; 525/332.8; 525/333.3; 525/370
[58] Field of Search .................... 525/314, 940, 525/332.8, 333.3, 370

[56] References Cited

U.S. PATENT DOCUMENTS

| | | | |
|---|---|---|---|
| 3,429,936 | 2/1969 | Godt, Jr. | 260/632 |
| 3,644,588 | 2/1972 | Hassell | 525/940 |
| 3,855,185 | 12/1974 | Loveless et al. | 525/338 |
| 4,879,349 | 11/1989 | Hoxmeier | 525/332.8 |
| 4,927,892 | 5/1990 | Drent et al. | 525/340 |
| 4,980,422 | 12/1990 | Willis | 525/370 |
| 4,981,916 | 1/1991 | Willis | 525/332.8 |
| 5,013,798 | 5/1991 | Hoxmeier | 525/332.8 |

FOREIGN PATENT DOCUMENTS

| | | |
|---|---|---|
| 313150 | 4/1989 | European Pat. Off. . |
| 360356 | 3/1990 | European Pat. Off. . |
| 1497289 | 10/1966 | France . |
| 1222260 | 8/1966 | Germany . |

*Primary Examiner*—Vasu S. Jagannathan

[57] ABSTRACT

Polymers containing ketone groups such as hydroesterified 1,3-butadiene polymers, including styrenic block copolymers, are hydrogenated with a cobalt/aluminum catalyst which substantially converts ketone groups to alcohol groups and improves polymer stability.

14 Claims, No Drawings

HYDROGENATION OF POLYMERS HAVING KETONE GROUPS

BACKGROUND OF THE INVENTION

The invention relates to hydrogenation of polymers and copolymers having ketone groups, and to specific polymers resulting from the hydrogenation process.

Polymers and copolymers having ketone groups are known. For example, U.S. Pat. No. 4,981,916 describes the hydroesterification of 1,3-butadiene polymers and copolymers to add ketone linking groups and ester groups and further describes hydrogenation of these ketone containing polymers with conventional nickel/aluminum catalysts which do not substantially alter the added ketone linking groups and ester groups.

SUMMARY OF THE INVENTION

The present invention includes the discovery that hydrogenation of polymers and copolymers having ketone groups with a cobalt/aluminum catalyst converts most of the ketone groups to alcohol groups. Although the cobalt/aluminum catalysts are not as efficient as nickel/aluminum catalysts with respect to hydrogenation of residual carbon-carbon unsaturation, the substantial conversion of ketone groups was most unexpected and allows improved stability and wider utilization of the polymers. A preferred embodiment of this invention is the hydrogenation of the hydroesterified 1,3-butadiene polymers and copolymers of U.S. Pat. Nos. 4,981,916 and 4,927,892.

The preferred polymers of the invention can be identified as 1,3-butadiene polymers or block copolymers having structures pendent from one or more backbone carbon atoms as represented by both Equation I and Equation II:

$$\begin{array}{ll} \underset{|}{\text{O}=\text{C}-\text{OR}} & \underset{|}{\text{OR}} \\ -\text{CH}-\text{CH}_3 \text{ or } -\text{CH}_2-\text{CH}_2-\text{C}=\text{O} \end{array} \quad \text{(I)}$$

$$\begin{array}{l} \text{CH}_3 \\ | \\ -\text{CH}-\text{CH}-\text{OH} \\ | \end{array} \quad \text{(II)}$$

wherein R represents a hydrocarbon group having 1 to 20 carbon atoms. According to equation I, carboxylic ester groups are present and are preferably not fully hydrogenated by the cobalt/aluminum catalyst. From equation II, alcohol linking groups are present from substantial hydrogenation of ketone linking groups in the hydroesterified polymers. Each alcohol linking group probably links a backbone carbon atom in a polymerized butadiene unit having 1,4-microstructure, with or without olefinic unsaturation, and a backbone carbon atom in an adjacent polymerized butadiene unit having 1,2 microstructure, but may link different polymer molecules.

The 1,3-butadiene polymers which contain significant amounts of the following structure:

$$\begin{array}{l} \text{CH}_3 \\ | \\ -\text{CH}-\text{C}=\text{O} \\ | \\ \text{+C}=\text{CH+} \end{array}$$

wherein —(C=CH)— represents backbone unsaturation have poor stability. The substantial hydrogenation of this structure to the following structure:

$$\begin{array}{l} \text{CH}_3 \\ | \\ -\text{CH}-\text{CH}-\text{OH} \\ | \\ \text{+CH}-\text{CH}_2\text{+} \end{array}$$

wherein —(CH—CH$_2$)— represents backbone saturation improves stability and is preferred.

DETAILED DESCRIPTION OF THE INVENTION

The process of the invention can be employed to hydrogenate with cobalt/aluminum catalysts any polymer or copolymer that contains ketone groups such as olefin polymers that contain carbonyl acid or carboxylic ester functional groups, or α-olefin/carbon monoxide copolymers. The preferred polymers of the invention are identified as hydrogenated 1,3-butadiene polymers or block copolymers having structures pendent from one or more backbone carbon atoms as represented by both Equation I and Equation II:

$$\begin{array}{ll} \underset{|}{\text{O}=\text{C}-\text{OR}} & \underset{|}{\text{OR}} \\ -\text{CH}-\text{CH}_3 \text{ or } -\text{CH}_2-\text{CH}_2-\text{C}=\text{O} \end{array} \quad \text{(I)}$$

$$\begin{array}{l} \text{CH}_3 \\ | \\ -\text{CH}-\text{CH}-\text{OH} \\ | \end{array} \quad \text{(II)}$$

wherein R represents a hydrocarbon group having 1 to 20 carbon atoms. According to equation I, a carboxylic ester is present which preferably is not fully hydrogenated by the cobalt/aluminum catalyst. From equation II, alcohol linking groups are present from substantial hydrogenation of ketone linking groups in hydroesterified polymers as described in U.S. Pat. No. 4,981,916, which is incorporated by reference herein. Each alcohol linking group probably links a backbone carbon atom in a polymerized butadiene unit having 1,4-microstructure, with or without olefinic unsaturation, and a backbone carbon atom in an adjacent polymerized butadiene unit having 1,2 microstructure as follows:

$$\begin{array}{c} \text{CH}_3 \\ | \\ \text{CH}-\text{CH}-\text{OH} \\ / \quad \backslash \\ -\text{CH}_2-\text{CH}-\text{CH}_2-\text{C}=\text{CH}-\text{CH}_2- \end{array}$$

or $$\begin{array}{c} \text{CH}_3 \\ | \\ \text{CH}-\text{CH}-\text{OH} \\ / \quad \backslash \\ -\text{CH}_2-\text{CH}-\text{CH}_2-\text{CH}-\text{CH}_2-\text{CH}_2- \end{array}$$

but may link different polymer molecules.

The preferred polymers of the invention are produced by first reacting a polymerized 1,3-butadiene polymer, including styrenic block copolymers, with carbon monoxide and an alcohol as described in U.S. Pat. Nos. 4,981,916 or 4,927,852, both descriptions being incorporated by reference herein. The hydroesterified butadiene polymers which contain ketone linking groups and ester groups are then hydrogenated with a cobalt/aluminum catalyst as described more fully below.

The starting polymer is most preferably a block copolymer of butadiene and a monoalkenylarene, the block copolymer having at least two monoalkenylarene blocks which are separated by at least one polymerized 1,3-butadiene block which includes adjacent 1,2 and 1,4 microstructure. Examples of useful monoalkenylarene compounds are styrene, 2-methylstyrene, and 4-methylstyrene. Examples of other conjugated dienes which may be present in the block copolymer include isoprene and 1,3-pentadiene. The block copolymers may include random or tapered blocks as long as at least one of the block contains predominently monoalkenylarene units and at least one of the polymer block contains at least predominently conjugated diene units. Very good results have been obtained with essentially homopolymer blocks of styrene and butadiene.

The ester groups represented by Equation I have been introduced into homopolymer blocks of polymerized isoprene. However, the isoprene blocks did not contain ketone linking groups which are hydrogenated to the alcohol linking groups of Equation 2.

The 1,3-butadiene polymers which contain significant amounts of the following structure:

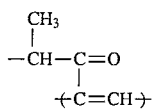

wherein —(C=CH)— represents backbone unsaturation have poor stability. The substantial hydrogenation of this structure to the following structure:

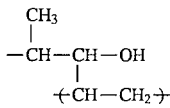

wherein —(CH—CH$_2$)— represents backbone saturation improves stability and is most preferred.

The hydrogenation process of the present invention is similar to the nickel/aluminum process described in U.S. Pat. Nos. Re 27,145 and 4,981,916 which descriptions are incorporated by reference herein. The present catalyst includes a cobalt compound selected from cobalt 2-ethylhexanoate, cobalt acetate, and cobalt carbonyl and an alkyl aluminum compound. Hydrogenation has been achieved with a mixture of cobalt 2-ethylhexanoate (sometimes called cobalt octanoate) and triethylaluminum in cyclohexane wherein the molar ratio of aluminum to cobalt was about 2/1.

The cobalt 2-ethylhexanoate/triethylaluminum catalyst has surprisingly converted most of the ketone linking groups in a preferred styrenic block copolymer to alcohol linking groups. The carbonyl portion of the ester groups in equation 1 appears to be hydrogenated to alcohol groups although a substantial amount of ester groups remain. Derivatives of the remaining ester groups in the described polymers can be prepared using standard reactions such as hydrolysis to prepare acids or the corresponding salts, amidation with amines, or transesterification to form different ester groups.

In addition to hydrogenation, conventional stabilizers can further improve the polymer stability.

The following Examples further illustrate the invention.

EXAMPLE 1

Ketone linking groups and carboxylic ester groups were introduced into the butadiene block of a styrene-butadiene-styrene block copolymer (mol. wt. 8,900–37,900–9,700 with 38% 1,2-microstructure) using the following procedure which is detailed in U.S. Pat. No. 4,981,916.

A 5% wt/wt solution of the polymer (74 g) in a mixed cyclohexane (1200 g) and methanol (180 g) solvent was loaded into a 1 gal. autoclave. A catalyst charge of cobalt (2) octanoate in mineral spirits (12% Co(w/w), 9.91 g, 20 mmol) and pyridine (4.8 g, 61 mmol) was added as a solution in cyclohexane (16 g). The well stirred solution was sparged at room temperature with carbon monoxide (900 psig, 1 min) to remove gaseous impurities. The vessel was brought up to reaction pressure (750 psig) by addition of carbon monoxide and sealed. The vessel was heated to 150° C. After 3.5 hr. at these conditions, the reaction was allowed to cool (reaction mixture was allowed to stand overnight, although the solution was at room temperature in about 6 hrs). An aliquot of the product solution was cast into a thin polymer film by evaporation of the solvent. Analysis of the elastomeric film by an Infrared (IR) method found both ester and ketone functionality in the product. Ester functionality was characterized by a signal on 1740 cm$^{-1}$ and ketones were noted at 1700 cm$^{-1}$. A band at 1600 cm$^{-1}$ was attributed to polystyrene and was used as an internal reference signal. The absorbances (A) of these bands were measured using an integration method and compared as follows: $A_{(Ketone)}/A_{(Ester)}=0.40$; $A_{(Ketone)}/A_{(Styrene)}=0.45$; $A_{(Ester)}/A_{(Styrene)}=1.14$.

Another aliquot of the functionalized polymer was purified using a chromatography technique. The reaction product solution was acidified (100 ml of 5% w/w conc. HCl in isopropyl alcohol (IPA)) and passed through a column (1.4 in. dia.) of basic alumina (80 g, Woelm 200 mesh, Super I Activity) over neutral alumina (150 g, same grade). Coagulation in IPA afforded a white polymer crumb with low levels of catalyst residues as determined by elemental analysis (Co-210 ppm, N-34 ppm). The combined chromatography-coagulation process was preferred for removal of catalyst residues from the functionalized polymer.

A hydrogenation catalyst was prepared under an inert atmosphere by combining slowly with stirring cobalt 2-ethyl hexanoate (17.75 g of 12% w/w suspension in mineral spirits) in dry cyclohexane (250 g) and triethyl aluminum (TEA) (33.3 g of 25.3% w/w solution in cyclohexane). The reagents were added slowly to minimize the temperature increase associated with the exothermic reaction. The product solution contained aluminum/cobalt at a ratio of 2/1 (mol/mol) and was used as made for hydrogenation experiments.

An aliquot of the purified reactor product was diluted with additional cyclohexane (5 wt. % polymer) and loaded into a 1 gal. autoclave. The solution was sparged with hydrogen to remove impurities. The reactor vent was closed and the well stirred mixture brought to 38° C. and 500 psi of hydrogen. The hydrogenation catalyst (Co/Al) was added in increments (40%, 40%, and 20%) to a final solution concentration of 600 ppm. After each aliquot of catalyst was added, the reaction temperature was allowed to stabilize (exotherm) before the next increment of catalyst was added. Reaction was maintained at 90° C. for 3 hours. At this point, additional catalyst solution was added to a final [Co]=880 ppm. Hydrogenation for an additional 3 hours at 70° C. gave a product which was substantially saturated whereby 78% of the starting unsaturation in the butadiene segment of the polymer had been hydrogenated. The spent hydrogenation catalyst was removed by washing the solution in an equal volume of aqueous H$_2$SO$_4$ (1% w/w). Coagulation in IPA afforded a white polymer crumb.

Analysis of the hydrogenated product using the IR method described above found $A_{(Ketone)}/A_{(Ester)}=0.14$; $A_{(Ketone)}/A_{(Styrene)}=0.13$; and $A_{(Ester)}/A_{(Styrene)}=0.97$. A broad band attributed to alcohol moieties was noted between 3000–4000 cm$^{-1}$ in the spectrum. Apparently most of the ketone centers and some of the ester sites in the starting polymer had been reduced to alcohol species. The product was a hydrogenated styrene butadiene-styrene block copolymer having alcohol, ester, and some ketone sites in the substantially saturated elastomer segment of the polymer.

EXAMPLE 2

The procedure of Example 1 was modified by reducing both the catalyst concentration and the reaction time. For this experiment, the catalyst concentration, both cobalt octanoate and pyridine, was reduced 4-fold from that used for Example 1 ([Co]=810 ppm). For this experiment, the [Co]=210 ppm while keeping the Pyridine/Co ratio at 3/1 (mol/mol). The reaction time was 1.5 hr.

Analysis of the product by IR found $A_{(Ketone)}/A_{(Ester)}=$ 0.52, $A_{(Ester)}/A_{(Styrene)}=0.83$, and $A_{(Ketone)}/A_{(Styrene)}=0.43$. This product contained a lower level of functionality than had been observed in Example 1. As suspected, the reduction of catalyst concentration and reaction time reduced the level of functionality in the product.

The product was purified using a liquid-liquid extraction technique. The reaction product solution was contacted with an equal volume mixture of aqueous $H_2SO_4$ (0.5% w/w) containing IPA (10% w/w). The blend was allowed to phase separate and the aqueous phase was discarded. The polymer solution was washed 3 more times and then an aliquot was coagulated in IPA. The resulting white polymer crumb contained less than 270 ppm of Co. The combined extraction coagulation method had removed most of the catalyst residue.

An aliquot of the purified solution of the ketone/ester modified SBS polymer was hydrogenated using the method and a catalyst (Co/Al) analogous to that described in Example 1. In this hydrogenation experiment, the polymer concentration was decreased by adding 260 g cyclohexane to the polymer aliquot and the catalyst concentration was decreased ([Co]=300 (1st dose)+300 (2nd dose) ppm).

Isolation and analysis of the product as reported in Example 1 found 44% conversion of the olefinic unsaturation prior to addition of the second aliquot of the catalyst and 91% conversion at the end with the final polymer having no ketone groups and reduced ester groups-$A_{(Ketone)}/A_{(Ester)}=0$; $A_{(Ketone)}/A_{(Styrene)}=0$, and $A_{(Ester)}/A_{(Styrene)}=0.17$. This product is a styrenic block copolymer having a partially saturated butadiene segment containing alcohol groups and some ester groups.

EXAMPLE 3

The procedure of Example 1 was modified for a styrene-isoprene (S-I) block copolymer (mol. wt. 39,000–68,000) by reducing the catalyst concentration. For this experiment the catalyst charge was ¼ that used in Example 1 ([Co]=810 ppm). In this example, the [Co]=220 ppm with pyridine/cobalt=3/1 (mol/mol).

Analysis of the product by IR found ester groups and no ketone groups; therefore, $A_{(Ketone)}/A_{(Ester)}=0$, $A_{(Ketone)}/A_{(Styrene)}=0$, and $A_{(Ester)}/A_{(Styrene)}=0.17$.

The reactor product solution was purified using the chromotography method noted in Example 1. An aliquot of purified solution was coagulated in IPA affording a white polymer crumb ([Co]=170 ppm), [N]=20 ppm).

Using an aliquot of the purified solution of the modified S-I polymer and the catalyst (Co/Al) of Example 2, a hydrogenated polymer was prepared. This experiment employed a polymer concentration of 4.5% w/w. All other reaction parameters were as described in Example 2.

Analysis of the isolated hydrogenated product found only 66% conversion of the residual unsaturation (C=C) but complete reduction of the ester centers. Again, there was evidence in the IR spectrum of alcohol functionality. As observed in Examples 1 and 2, the Co/Al hydrogenation technique resulted in hydrogenation of both C=C and C=O unsaturation. The product of this experiment was a styrenic block copolymer having alcohol functionality in a partially saturated isoprene block.

The starting, unsaturated, functionalized polymer had poor stability on exposure to air. A sample of the polymer which had been exposed to the atmosphere for 48 hrs. could not be redissolved. The hydrogenated polymer of the present invention was freely soluble in both cyclohexane and tetrahydrofuran when analyzed after 9 months of exposure to air. Hydrogenation had greatly enhanced the stability of this polymer to exposure to air.

The preceeding examples are illustrative of the invention and do not limit the following claims to the specific products or processes described therein.

What is claimed is:

1. A block copolymer comprising at least one monoalkenylarene block and at least one block comprising polymerized 1,3-butadiene units and both carboxylic ester groups and alcohol linking groups, the ester groups being pendent from backbone carbon atoms and the alcohol linking groups having the structure

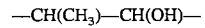

which connects two backbone carbon atoms, wherein the ester groups include either of the following structures

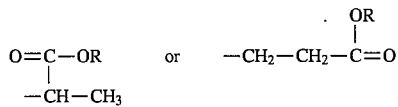

wherein R represents a hydrocarbon group having 1 to 20 carbon atoms, and wherein the block copolymer does not contain ketone groups when analyzed by an infrared method.

2. A functionalized block copolymer comprising:
at least two monoalkenylarene blocks; and
at least one functionalized conjugated diene block positioned between two monoalkenylarene blocks, the conjugated diene block having polymerized 1,3-butadiene units and both ester groups which are pendent from backbone carbon atoms and alcohol linking groups which link two backbone carbon atoms, the alcohol linking groups having the following structure

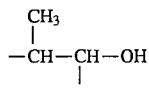

and the ester groups having either of the following structures

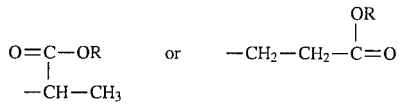

wherein R represents a hydrocarbon group having 1 to 20 carbon atoms;

wherein the block copolymer does not contain ketone groups when analyzed by an infrared method.

3. The block copolymer of claim 2 wherein the conjugated diene block predominently comprises polymerized 1,3-butadiene.

4. The block copolymer of claim 2 wherein the monoalkenylarene block predominently comprises polystyrene.

5. The block copolymer of claim 2 wherein the alcohol linking groups complete either of the following structures

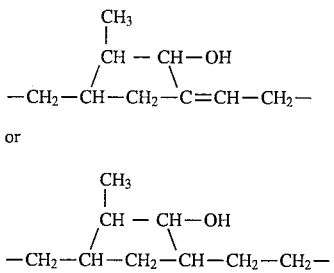

combination with the polymer backbone.

6. The block copolymer of claim 2 wherein R is a methyl group.

7. The block copolymer of claim 2 wherein substantially all of the polymerized 1,3-butadiene units do not have olefinically unsaturated carbon-carbon bonds.

8. A process for hydrogenating a polymer or copolymer containing ketone groups, comprising the steps of:

contacting the polymer or copolymer with hydrogen in the presence of a catalyst which comprises a cobalt compound, selected from cobalt 2-ethylhexanoate, cobalt acetate, and cobalt carbonyl, and an alkyl aluminum compound; and recovering the polymer or copolymer after sufficient time for conversion of ketone groups to alcohol groups.

9. The process as claimed in claim 8 in which the polymer is a 1,3-butadiene polymer or copolymer.

10. The process as claimed in claim 8 in which the cobalt compound is cobalt 2-ethylhexanoate and the alkyl aluminum compound is triethylaluminum.

11. The process as claimed in claim 8 in which the catalyst contains 2 mol of aluminum per mol of cobalt and the catalyst is added in increments to a final cobalt concentration of at least 600 ppm.

12. A process for hydrogenating a hydroesterified 1,3-butadiene polymer, the process comprising the steps of:

contacting the polymer of 1,3-butadiene polymer or copolymer of 1,3-butadiene and a monoalkenyl arene with hydrogen in the presence of a catalyst which comprises a cobalt compound selected from cobalt 2-ethylhexanoate, cobalt acetate, and cobalt carbonyl and an alkyl aluminum compound, the polymer or copolymer having both ester groups which are pendent from backbone carbon atoms and ketone linking groups which link two or more backbone carbon atoms; and recovering the polymer or copolymer after sufficient time for conversion of substantially all of the ketone linking groups to alcohol linking groups.

13. The process as claimed in claim 12 in which the modified polymer is a hydroesterified polystyrene-butadiene-polystyrene block copolymer.

14. The process as claimed in claim 13 in which the cobalt compound is cobalt 2-ethylhexanoate and the alkyl aluminum compound is triethylaluminum.

* * * * *